United States Patent
Feltham et al.

(10) Patent No.: US 10,599,318 B2
(45) Date of Patent: Mar. 24, 2020

(54) COLUMN AWARE SCROLLING

(71) Applicant: International Business Machines Corporation, Armonk, NY (US)

(72) Inventors: Andrew S. Feltham, Hampshire (GB); Dominic P. Harries, Winchester (GB); Graham White, Hampshire (GB)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 1015 days.

(21) Appl. No.: 14/714,715

(22) Filed: May 18, 2015

(65) Prior Publication Data

US 2015/0355833 A1 Dec. 10, 2015

(30) Foreign Application Priority Data

Jun. 5, 2014 (GB) .................................. 1409988.1

(51) Int. Cl.
*G06F 3/048* (2013.01)
*G06F 3/0485* (2013.01)
*G06F 3/0483* (2013.01)
*G06F 3/0481* (2013.01)

(52) U.S. Cl.
CPC ........ *G06F 3/04855* (2013.01); *G06F 3/0481* (2013.01); *G06F 3/0483* (2013.01)

(58) Field of Classification Search
None
See application file for complete search history.

(56) References Cited

U.S. PATENT DOCUMENTS

| 5,877,760 A * | 3/1999 | Onda ................... G06F 3/0334 715/784 |
| 6,204,846 B1 * | 3/2001 | Little .................. G06F 3/04855 715/784 |
| 6,275,223 B1 * | 8/2001 | Hughes ................ G06F 3/0483 715/751 |
| 8,411,046 B2 | 4/2013 | Kruzeniski et al. |
| 8,438,496 B1 | 5/2013 | Hegde |
| 8,527,863 B2 | 9/2013 | Duquene et al. |

(Continued)

FOREIGN PATENT DOCUMENTS

WO    WO2009026508 A1    2/2009

OTHER PUBLICATIONS

E. Ishak, et al., "Content-Aware Scrolling," Processing UIST '06 Proceeding of the 19th Annual ACM Symposium on User Interface Software and Technology; pp. 1-4.

(Continued)

*Primary Examiner* — Thanh T Vu
(74) *Attorney, Agent, or Firm* — Cantor Colburn LLP; Aaron Pontikos

(57) ABSTRACT

Embodiments relate to controlling display of a document, where the document comprises multiple columns. An aspect includes displaying the columns of the document in a viewport, receiving a user input defining a downwards scrolling for the document. Another aspect includes determining the lowest numbered column that does not have its lowest point displayed in the viewport. Another aspect includes scrolling upwards only the lowest numbered column that does not have its lowest point displayed in the viewport, while maintaining all other columns stationary in the viewport.

15 Claims, 7 Drawing Sheets

(56) References Cited

U.S. PATENT DOCUMENTS

2006/0174212 A1 8/2006 Cok
2006/0236261 A1 10/2006 Forstall et al.
2009/0150822 A1* 6/2009 Miller ................. G06F 3/0485
 715/784
2010/0077343 A1 3/2010 Uhl et al.

OTHER PUBLICATIONS

International Search Report for Application No. GB1409988.1 filed Jun. 5, 2014; dated Nov. 28, 2014; pp. 1-4.

* cited by examiner

COLUMN AWARE SCROLLING

BACKGROUND

The present disclosure relates generally to displaying of documents, and more specifically, to controlling the display of a document, when the document comprises multiple columns.

Paper is becoming progressively obsolete. Companies in particular are trying to save money and resources by providing user manuals and other literature in a digital format rather than hard copy, and by making these versions available online. Despite this shift, the target media does not seem to change and as a result the digital copies are still formatted as if they were going to be printed. One specific example is that documents are still produced with multiple columns of text. The problem with this approach is that when reading the document in a digital format the scrolling provided by the application is not aware of the progression of text within the document and as a result the document is scrolled a screen at a time, rather than following the natural flow of the text. Owing to the same constraints, individuals are reluctant to print out the media to make this process easier and so the result is a lot of unnecessary scrolling to follow the flow of the text (for example at the bottom of one column of text, a reader might need to scroll up to begin reading the next column) A better solution to this problem is needed so that documents can maintain their design (often due to other constraints) but still maintain their readability.

An alternative approach is to remove all formatting to display the text without any columns at all. This approach has been implemented by Adobe PDF and has some limitations. For example, not all PDFs can be viewed in this way because of the way they were created and in addition any contextual information written in the document (such as "the image on the left") is lost as part of the translation process.

SUMMARY

Embodiments relate to controlling display of a document, where the document comprises multiple columns. An aspect includes displaying the columns of the document in a viewport, receiving a user input defining a downwards scrolling for the document. Another aspect includes determining the lowest numbered column that does not have its lowest point displayed in the viewport. Another aspect includes scrolling upwards only the lowest numbered column that does not have its lowest point displayed in the viewport, while maintaining all other columns stationary in the viewport.

BRIEF DESCRIPTION OF THE DRAWINGS

Various embodiments of the present invention will now be described, by way of example only, with reference to the following drawings, in which.

DETAILED DESCRIPTION

Figure 1:
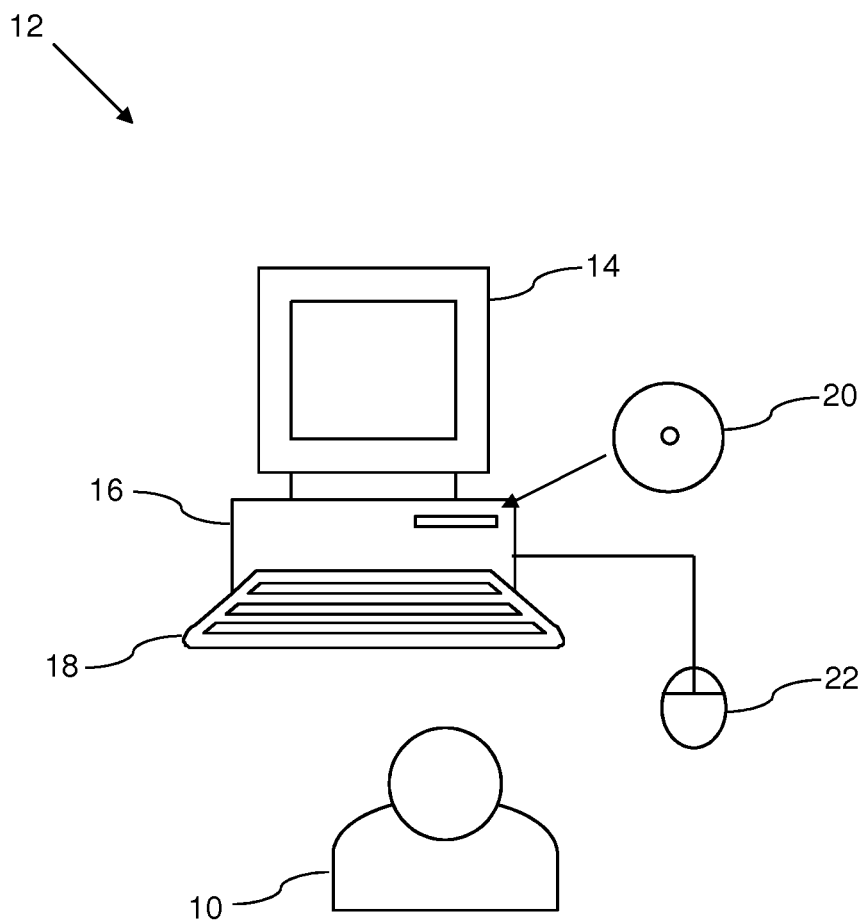
FIG. 1 is a schematic diagram of an embodiment of a computing system.

According to a first aspect, there is provided a method of controlling the display of a document, the document comprising multiple columns, the method comprising displaying the columns of the document in a viewport, receiving a user input defining a downwards scrolling for the document, determining the lowest numbered column that does not have its lowest point displayed in the viewport, and scrolling upwards only the lowest numbered column that does not have its lowest point displayed in the viewport, while maintaining all other columns stationary in the viewport.

According to a second aspect, there is provided a system for controlling the display of a document, the document comprising multiple columns, the system comprising a display device arranged to display the columns of the document in a viewport, a user interface device arranged to receive a user input defining a downwards scrolling for the document, and a processor connected to the display device and the user interface device and arranged to determine the lowest numbered column that does not have its lowest point displayed in the viewport, and scroll upwards only the lowest numbered column that does not have its lowest point displayed in the viewport, while maintaining all other columns stationary in the viewport.

According to a third aspect, there is provided a computer program product for a computer readable medium for controlling the display of a document, the document comprising multiple columns, the product comprising instructions for displaying the columns of the document in a viewport, receiving a user input defining a downwards scrolling for the document, determining the lowest numbered column that does not have its lowest point displayed in the viewport, and scrolling upwards only the lowest numbered column that does not have its lowest point displayed in the viewport, while maintaining all other columns stationary in the viewport.

Embodiments provide a mechanism for column scrolling that does not require any additional information to be provided with the text, and maintains the original format of the text. This method, which can be used in any application, allows that application to provide "column aware scrolling". This provides a user with the ability to use a scrollbar or mouse wheel to navigate the logical progression of a document rather than the current implemented implementation of a scrollbar which scrolls the entire page. Any application implementing this method will then scroll content in individual columns as the user scrolls through rather than scrolling the whole page or document.

When a user views a document on a display device, if the document is larger than the available viewing area of the display device, as is common in modern computing systems, then the viewport defines the part of the document that is currently visible to the user. For example, if a user views a text document in a word processing application, then usually at most only one or two pages of the document can be seen at once in the viewport. The display device will normally show a scrollbar on the right-hand side of the display device to indicate the proportion of the document that is currently being shown in the viewport. As the user scrolls the document, using the scrollbar, or arrow keys or a roller button on a mouse, for example, then the visible part of the document in the viewport moves in the opposite direction to the scrolling instruction received. For example if a user wishes to move downwards in the document, then they scroll downwards (for example pressing the "down" arrow key) and in response, the document in the viewport moves upwards.

FIG. 1 shows a user 10 using a desktop computer system 12 to view a document. The computer system 12 comprises a display device 14, a processor 16 and a user input device (a conventional keyboard) 18. The processor 16 is connected to the display device 14 and the user input device 18. The processor 16 is running a suitable software application such as a word processing application with which the user 10 can interact via the graphical user interface of the application, which is being displayed by the display device 14. A CD-ROM 20 is shown, which can be used to store a copy of the application which is being executed by the processor 16.

An additional user interface device 22 is also shown, which is a conventional mouse 22. The user 10 utilises the keyboard 18 and mouse 22 to interact with the application being run by the processor 16 that is displaying the document that the user 10 is looking at on the display device 14. As mentioned above, it is very common that the size of the document being viewed is larger than the available display area on the display device 14. The user 10 sees on the display device 14 a viewport, which is the current portion of the document being displayed by the display device 14, which will be a single page of the document, for example.

The user 10 can change the viewport, in order to move around the document to view different parts of the document. The most common interaction in this respect is the use of a scrollbar, which is conventionally displayed at the right-hand side of the document. This scrollbar is sized and located to indicate the current page with respect to the whole length of the document. For example, if the user 10 is looking at page 2 of a 10 page document, then the scrollbar will be sized at 10% of the available space and positioned to start 10% from the top of the available space. The user can move the scrollbar using the keyboard 18 or mouse 22 to move the viewport.

Figure 2:
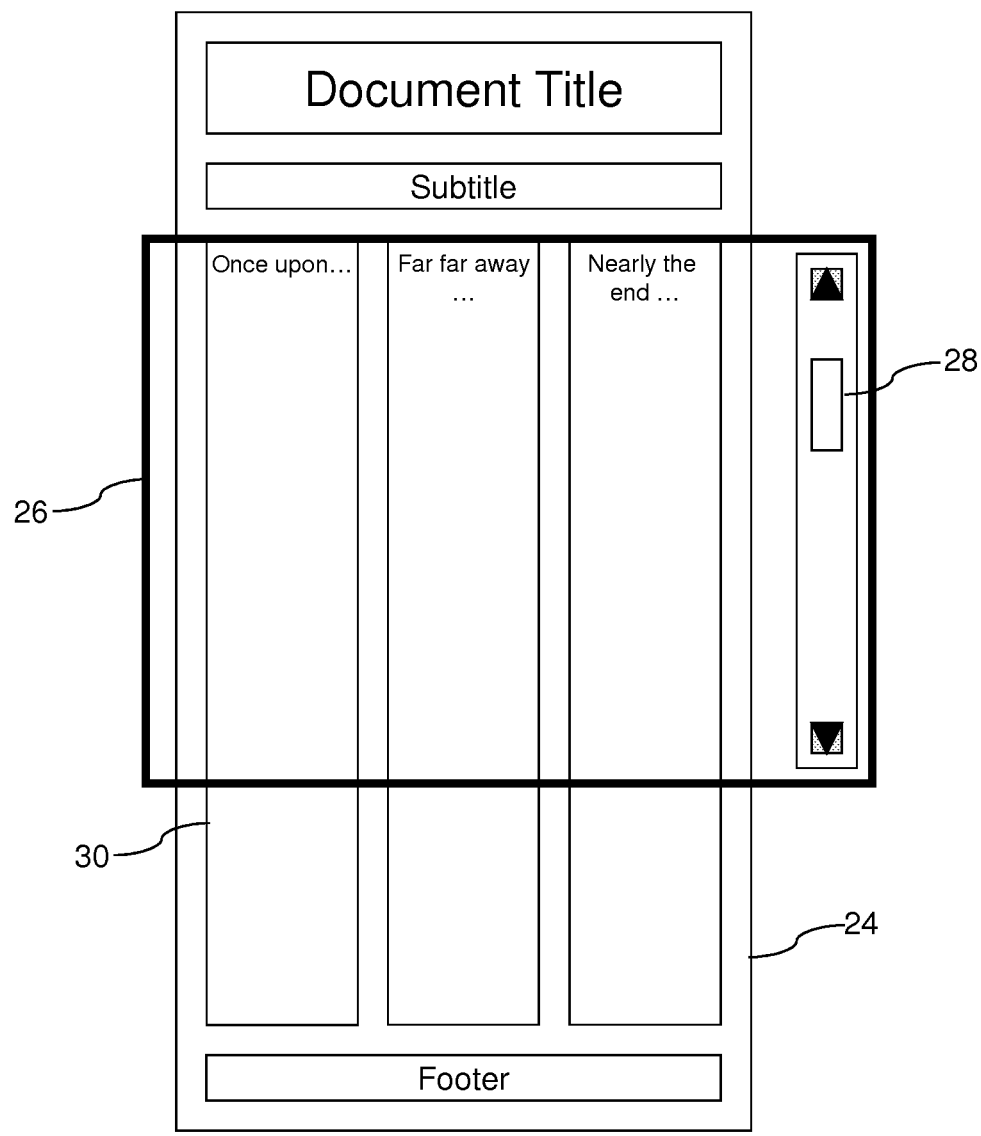
FIGS. 2 to 6 are schematic diagrams of a embodiments of a document with a viewport.

FIG. 2 illustrates the concept of a document 24 being seen through a viewport 26, which shows only a portion of the document 24 to the user 10 via the display device 14. The scrollbar 28 can also be seen in this Figure, to the right-hand side of the displayed portion of the document 24 in the viewport 26. The user 10 can move the viewport 26 by manipulating the scrollbar 28, either directly through a graphical user interface action (selecting the scrollbar with an on-screen cursor) or by using arrow keys on the keyboard 18. The mouse 22 is provided with a wheel on the top surface that can be rotated to scroll the document 24.

The application that is being run by the processor 16 controls the output of the display device 14 and responds to the scrolling instructions received from the user interface devices 18 and 22. As can be seen in FIG. 2, the document 24 contains within it three columns 30, in one portion of the text. As with normal scrolling, any content within the document 24 which occupies the width of the screen 14 will be scrolled normally. In this example document 24, the page scrolls until the three columns 30 reach the top of the visible content (the viewport 26). At this point, the "column aware scrolling" provides a different behaviour to normal scrolling.

In a conventional document, when a user scrolls downwards (moving the document 24 upwards in the viewport 26) then the entire document 24 is scrolled, regardless of the existence of columns 30 within the document 24. Here though the three columns 30 are scrolled individually in turn, in order to provide a more efficient experience of reading the contents of the document 24 for the user 10. Each column 30 will be scrolled in turn, in order to reduce the overall amount of scrolling that a user 10 must undertake to read through the document 24, as normally a user 10 would need to scroll back up to the top of a column 30 once they have finished reading to the bottom of an adjacent column 30.

Figure 3:
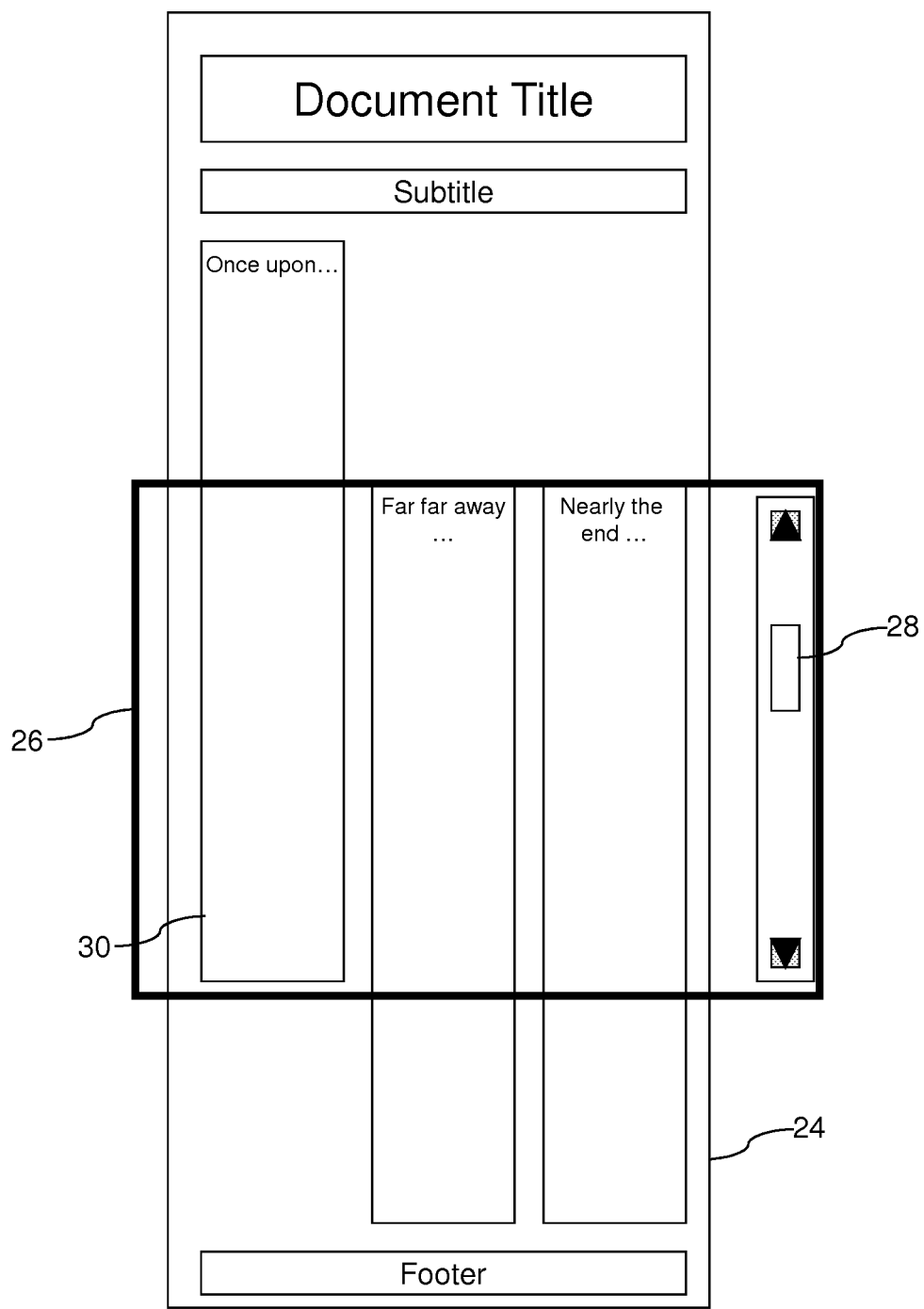

FIG. 3 shows the document 24 after the user 10 has scrolled down to the bottom of the left-hand column 30. As can be seen in this Figure, the viewport 26 now shows the bottom of the left-hand column 30 and the top of the middle and right-hand columns 30. Rather than scrolling all three columns 30 at the same time, the application can modify the relative positions of each column 30 such that the second and third columns stay at the top relative to the viewport 26 but the first column 30 is scrolled as normal until the bottom of its content is reached. The user interacts as normal using standard scrolling operations.

The modified column scrolling allows the user 10 to continue to read the first (lowest numbered) column 30 while ensuring that the next word they need to read (which is at the top of the middle column 30) is located at the top of the viewport 26 and is still visible. Once the user 10 has completed reading the leftmost column 30 then they can immediately continue reading the document 24 without having to first scroll back up to the top of the middle column 30, which is the normal interaction with a document containing columns that does not use the column aware scrolling described here. The amount of scrolling required by the user 10 is reduced.

No modification to the actual document 24 is required to achieve the column aware scrolling. The functionality is achieved at the application level, which is modified to identify the columns 30 within the document 24 and apply the column aware scrolling accordingly. For example, most common word processing applications will contain metadata within text documents about the existence of columns in the text, defining the number of columns and their height and so on. This data can be accessed by the application in order to modify the graphical user interface interactions made by the user 10. The application is controlled so that once columns are present in the viewport 26, then the modified scrolling is used.

Figure 4:
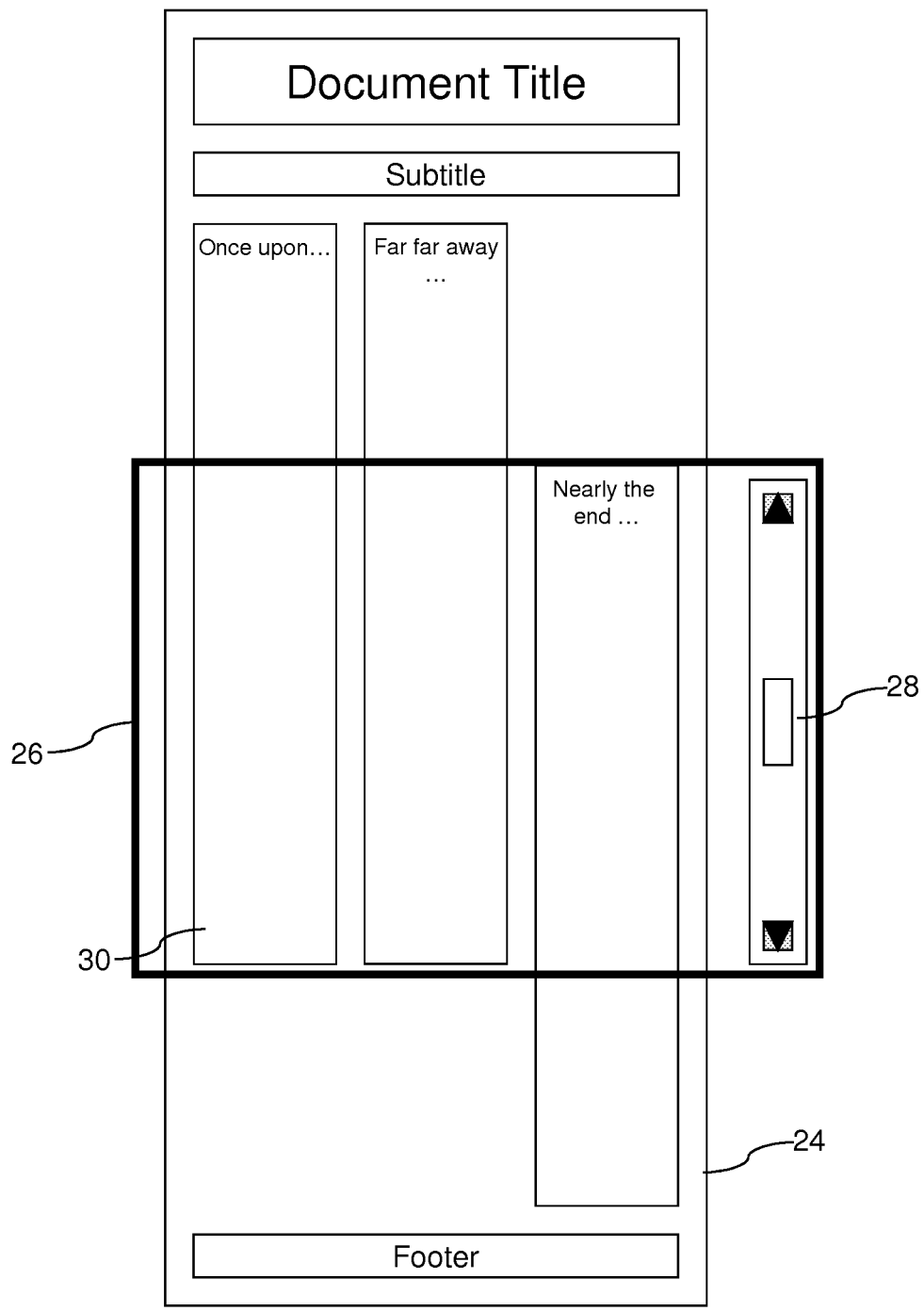

FIG. 4 shows the document 24 after the user 10 has scrolled down to the bottom of the middle column 30. As can be seen in this Figure, the viewport 26 now shows the bottom of the left-hand and middle columns 30 and the top of the right-hand column 30. As with the first column 30, as the user 10 scrolls the middle column 30 is then moved up the viewport 26 until the bottom of its content is visible. The user 10 is continuing to interact with the application in an entirely conventional fashion, using any appropriate scrolling operation to scroll down in the document 24. This results in the columns 30 being scrolled in turn.

The column aware scrolling provides an enhancement to the graphical user interface based on existing information already contained in a number of current document formats. For example, the following sample XML is taken from a document, which structures its metadata using XML, as shown in Table 1.

TABLE 1

XML Metadata

```
<w:sectPr w:rsidR="00842B07" w:rsidRPr="00E64128"
w:rsidSect="008D1C1E">
    <w:pgSz w:w="11906" w:h="16838"/>
    <w:pgMar w:top="1440" w:right="1800" w:bottom="1440"
    w:left="1800"
w:header="708" w:footer="708" w:gutter="0"/>
    <w:cols w:num="3" w:space="708" w:equalWidth="0">
        <w:col w:w="2288" w:space="720"/>
        <w:col w:w="2288" w:space="720"/>
        <w:col w:w="2288"/>
```

TABLE 1-continued

XML Metadata

```
    </w:cols>
    <w:docGrid w:linePitch="360"/>
</w:sectPr>
```

As can be seen from the snippet of XML in Table 1, this format already defines three columns, together with their respective widths and document height. Using this information it is possible for the application to implement the column aware scrolling.

No change to the actual document 24 itself is made by the application when delivering the column aware scrolling, and the user 10 can interact with the document 24 within the current application in the normal manner. For example, if the user 10 wishes to add or amend text within the document, they can do so without any interference. The user 10 can move the on-screen cursor about the document 24 without any restriction and can amend the text within the columns 30 as normal. The only change that the user notices to the document 24 is in the presentation of the columns 30 when they are scrolling the document 24.

Figure 5:
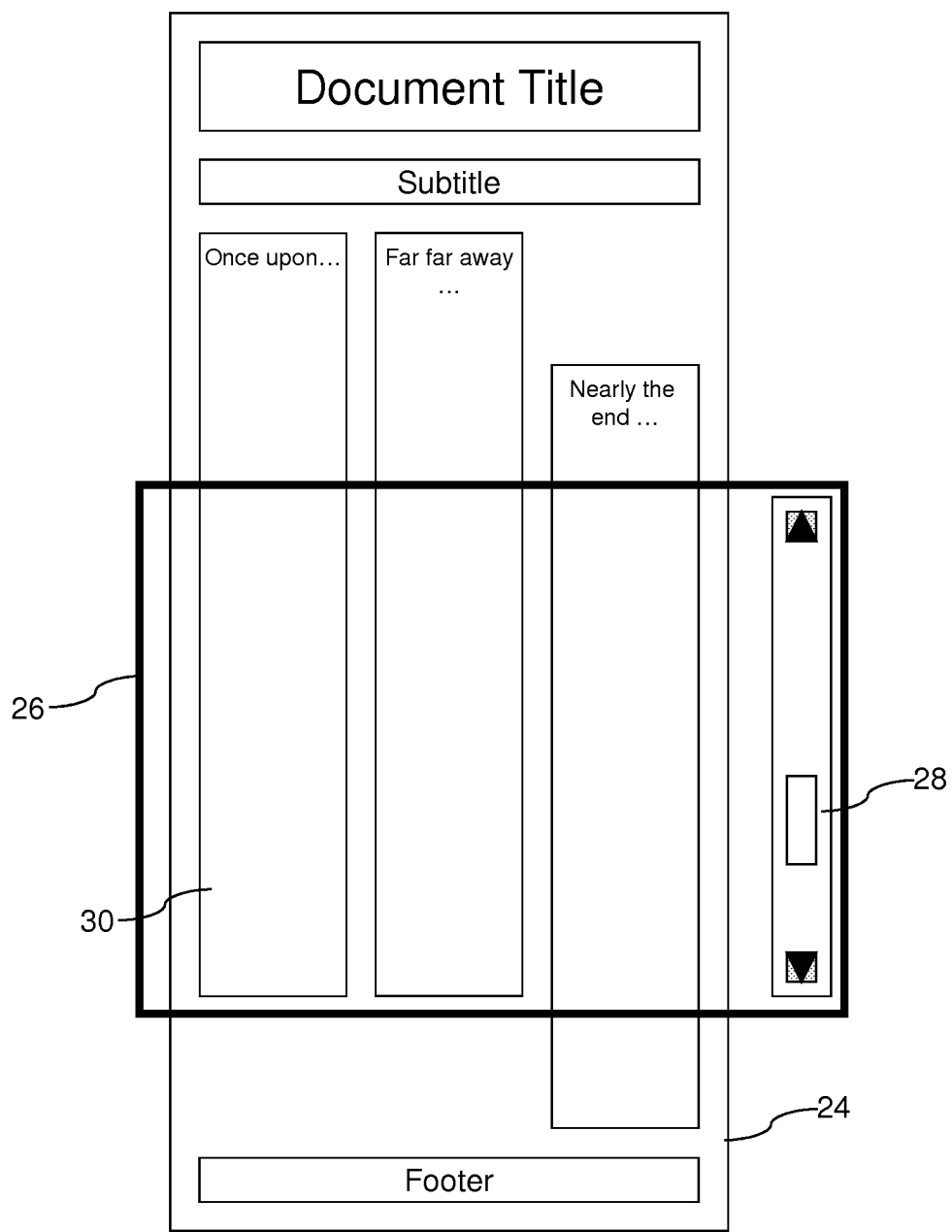
Figure 6:
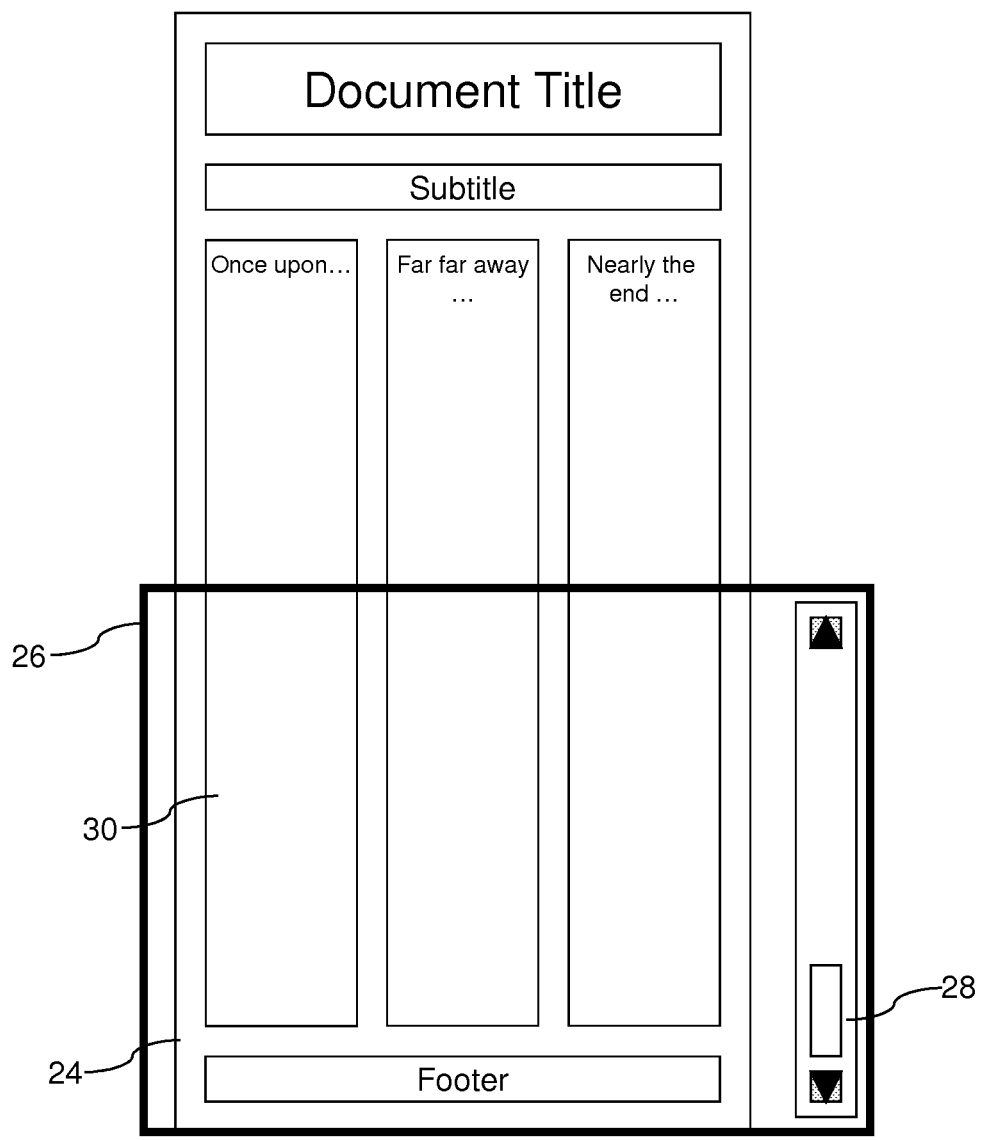

Lastly, the third column 30 of the document 24 is scrolled up, as shown in FIG. 5. As this column 30 is the last, when this column 30 is scrolled the content which follows it is also moved up so that it maintains its position relative to the bottom of the third column 30. When the bottom of the third column 30 is reached, as shown in FIG. 6, the next content fills the width of the document 24 and so the default behaviour is restored, specifically the whole document 24 is scrolled so that the footer can be read. Conventional scrolling will now be used for the remainder of the document 24.

When the application displays the scrollbar 28 it can calculate the total height of the multiple columns 30 in the document 24 and display a scrollbar 28 that is sized to reflect the total height of the multiple columns 30 in the document 24. Assuming that the current screen has a viewport 26 (i.e. the space visible for documents) with a height of 8000, in a conventional implementation when viewing the document 24 the scrollbar will operate to provide a range that is between 0 and x, where x is a number greater than 8000 and reflects the size of the document. This will allow the application to scroll the page so that the bottom of the page is at the bottom of the viewport 26.

In a column aware scrolling implementation the application will use a different range which is the calculated from the total height of each of the columns on a specific page. For example, assuming a single page document:

Current Implementation:

Scrollable Distance=document height−viewport height

Column Aware Scrolling Implementation:

Scrollable Distance=((column height−viewport height)*number of columns)+height of any additional paragraphs or sections that are not in columns Once the alternative scrolling distance has been calculated, the current position of the scrollbar 28 can be used to identify how far through the document 24, rather than the page, the user 10 is currently viewing and in doing so identify which of the columns 30 need to be moved. If a document 24 does not contain metadata about the columns 30 that are present, then known algorithms such as run-length smoothing could be used to automatically produce this information.

Figure 7:
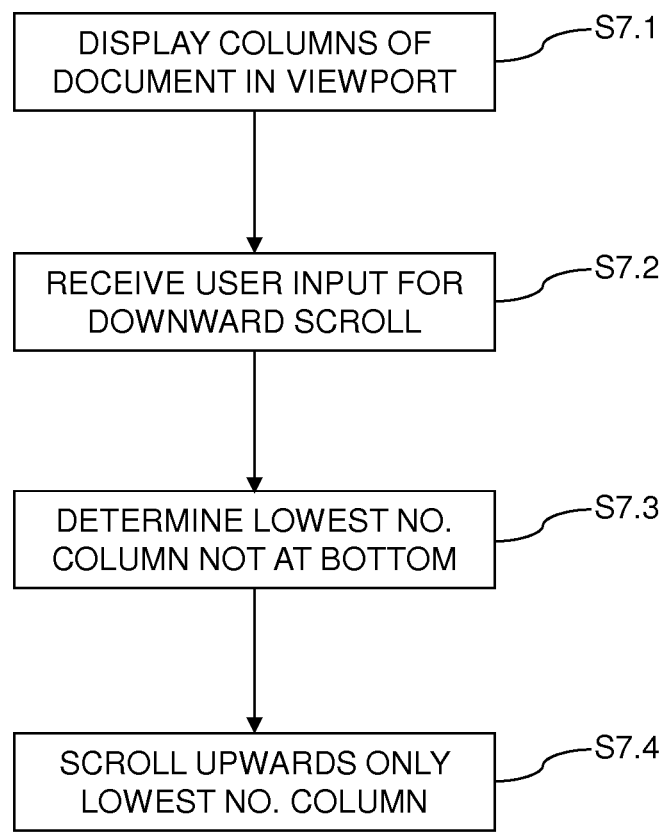
FIG. 7 is a flowchart of an embodiment of a method of controlling the display of the document.

An embodiment of a method of controlling the display of the document 24 is summarised in the flowchart of FIG. 7. The document 24 comprises multiple columns 30 in at least some part of the document 24. A portion of the document 24 is currently being displayed to the user 10 in a viewport 26 (which is the visible part of the display device 14 that is being used to show the document 24). First, block S7.1 comprises displaying the columns 30 of the document 24 in the viewport 26. It is assumed that only a portion of the columns 30 are currently being displayed in the viewport 26.

Next, block S7.2 comprises receiving a user input defining a downwards scrolling for the document 24. This user input can come from any source that the user 10 would normally use to input a scrolling action, such as using the mouse 22, keyboard 18 or even the display device 14 itself, if the user 10 is using a touchscreen device such as a tablet computer, to input the scrolling action. The downward scrolling action from the user 10 is designed to move the document 24 upwards as the user 10 reads downwards. The display of the document 24 is amended by the so-called column aware scrolling.

Next, in block S7.3, in which the lowest numbered column 30 that does not have its lowest point displayed in the viewport 26 is determined Lastly, in block S7.4, scrolling upwards only the lowest numbered column 30 that does not have its lowest point displayed in the viewport 26 is performed, while maintaining all other columns 30 stationary in the viewport 26. This ensures that the columns 30 of the document 24 are scrolled in turn within the visible viewport 26.

In the context of a European left-to-right language such as English, then the lowest numbered column will be the leftmost column and this will be the first column to be scrolled when the user is scrolling downwards. The columns are logically numbered from left to right. For languages that are read right-to-left, such as Arabic and Japanese, then the columns are numbered lowest at the right-hand side, as this will be the first column to be read by the user 10. When the user scrolls down, it will be still be the lowest numbered column that is scrolled first, but in this case it will be the rightmost column that is scrolled to the bottom first.

If the application receives a user input that defines a downwards scrolling for the document 24 and determines that all columns 30 have their lowest point displayed in the viewport 26, then the application scrolls upwards the entire document 24.

Although the flowchart of FIG. 7 describes the column aware scrolling in the context of the user scrolling downwards, the column aware scrolling also works in reverse, when the user is scrolling upwards. Therefore is the application receives a user input defining an upwards scrolling for the document 24, then the application determines the highest numbered column 30 that does not have its highest point displayed in the viewport 26 and scrolling downwards only the highest numbered column 30 that does not have its highest point displayed in the viewport 26, while maintaining all other columns 30 stationary in the viewport 26. If the application receives a user input defining an upwards scrolling for the document 24 and determines that all columns 30 have their highest point displayed in the viewport 26 then the application will scroll downwards the entire document 24.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention. Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be clear to one skilled in the art that many improvements and modifications can be made to the foregoing exemplary embodiment without departing from the scope of the present invention.

What is claimed is:
1. A method of controlling display of a document, the document comprising multiple columns, wherein the multiple columns are assigned incrementally increasing values based on an order in which they are intended to be read, the method comprising:

displaying the columns of the document in a viewport having a single scrollbar configured to individually control a portion of each of the columns displayed in the viewport, receiving a user input defining a downwards scrolling for the document, determining a lowest numbered column of the columns displayed that does not have its lowest point displayed in the viewport, wherein the lowest point of a column is an end of the column, and scrolling upwards only the lowest numbered column that does not have its lowest point displayed in the viewport, while maintaining all other columns stationary in the viewport.

2. A method according to claim 1, further comprising calculating a total height of the multiple columns in the document and displaying a scrollbar sized to reflect the total height of the multiple columns in the document.

3. A method according to claim 1, further comprising receiving a user input defining an upwards scrolling for the document, determining a highest numbered column that does not have its highest point displayed in the viewport, and scrolling downwards only the highest numbered column that does not have its highest point displayed in the viewport, while maintaining all other columns of the multiple columns stationary in the viewport.

4. A method according to claim 1, further comprising receiving a user input defining a downwards scrolling for the document, determining that all of the multiple columns have their respective lowest point displayed in the viewport, and scrolling upwards all of the multiple columns of the document.

5. A method according to claim 1, further comprising receiving a user input defining an upwards scrolling for the document, determining that all of the multiple columns have their respective highest point displayed in the viewport, and scrolling downwards all of the multiple columns of the document.

6. A system for controlling display of a document, the document comprising multiple columns, wherein the multiple columns are assigned incrementally increasing values based on an order in which they are intended to be read, the system comprising:

a display device configured to display the columns of the document in a viewport having a single scrollbar configured to individually control a portion of each of the columns displayed in the viewport, a user interface device configured to receive a user input defining a downwards scrolling for the document, and a processor connected to the display device and the user interface device and configured to determine a lowest numbered column that does not have its lowest point displayed in the viewport, and scroll upwards only the lowest numbered column that does not have its lowest point displayed in the viewport, while maintaining all other columns stationary in the viewport.

7. A system according to claim 6, wherein the processor is further configured to calculate a total height of the multiple columns in the document and the display device is configured to display a scrollbar sized to reflect the total height of the multiple columns in the document.

8. A system according to claim 6, wherein the user interface device is further configured to receive a user input defining an upwards scrolling for the document, and the processor is further configured to determine a highest numbered column that does not have its highest point displayed in the viewport, and scroll downwards only the highest numbered column that does not have its highest point displayed in the viewport, while maintaining all other columns of the multiple columns stationary in the viewport.

9. A system according to claim 6, wherein the user interface device is further configured to receive a user input defining a downwards scrolling for the document, and the processor is further configured to determine that all of the multiplied columns have their respective lowest point displayed in the viewport, and scrolling upwards all of the multiple columns of the document.

10. A system according to claim 6, wherein the user interface device is further configured to receive a user input defining an upwards scrolling for the document, and the processor is further configured to determine that all of the multiple columns have their respective highest point displayed in the viewport, and scrolling downwards all of the multiple columns of the document.

11. A computer program product for controlling display of a document, the document comprising multiple columns, wherein the multiple columns are assigned incrementally increasing values based on an order in which they are intended to be read, the computer program product comprising a non-transitory computer readable storage medium having program instructions embodied therewith, the program instructions executable by a processor to cause the processor to:

displaying the columns of the document in a viewport having a single scrollbar configured to individually control a portion of each of the columns displayed in the viewport, receiving a user input defining a downwards scrolling for the document, determining a lowest numbered column that does not have its lowest point displayed in the viewport, and scrolling upwards only the lowest numbered column that does not have its lowest point displayed in the viewport, while maintaining all other columns stationary in the viewport.

12. A computer program product according to claim 11, further comprising instructions for calculating a total height of the multiple columns in the document and displaying a scrollbar sized to reflect the total height of the multiple columns in the document.

13. A computer program product according to claim 11, further comprising instructions for receiving a user input defining an upwards scrolling for the document, determining a highest numbered column that does not have its highest point displayed in the viewport, and scrolling downwards only the highest numbered column that does not have its highest point displayed in the viewport, while maintaining all other columns of the multiple columns stationary in the viewport.

14. A computer program product according to claim 11, further comprising instructions for receiving a user input defining a downwards scrolling for the document, determining that all columns of the multiple columns have their respective lowest point displayed in the viewport, and scrolling upwards all of the multiple columns of the document.

15. A computer program product according to claim 11, further comprising instructions for receiving a user input defining an upwards scrolling for the document, determining that all columns of the multiple columns have their respective highest point displayed in the viewport, and scrolling downwards all of the multiple columns of the document.

* * * * *